US012728643B2

(12) United States Patent
Tsujimura

(10) Patent No.: US 12,728,643 B2
(45) Date of Patent: Sep. 8, 2026

(54) LIQUID EJECTION APPARATUS AND CONTROL METHOD FOR LIQUID EJECTION APPARATUS

(71) Applicant: SEIKO EPSON CORPORATION, Tokyo (JP)

(72) Inventor: Sawako Tsujimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 18/614,819

(22) Filed: Mar. 25, 2024

(65) Prior Publication Data

US 2024/0326443 A1 Oct. 3, 2024

(30) Foreign Application Priority Data

Mar. 28, 2023 (JP) ................................ 2023-051093

(51) Int. Cl.
*B41J 2/165* (2006.01)

(52) U.S. Cl.
CPC ....... *B41J 2/16544* (2013.01); *B41J 2/16526* (2013.01)

(58) Field of Classification Search
CPC .......................... B41J 2/16544; B41J 2/16526
See application file for complete search history.

(56) References Cited

U.S. PATENT DOCUMENTS

2005/0275687 A1* 12/2005 Furuichi .............. B41J 2/16529 347/43
2007/0046723 A1* 3/2007 Matsuhashi .......... B41J 11/0065 347/32
2011/0193906 A1* 8/2011 Kawakami ........... B41J 2/16526 347/14
2021/0101387 A1 4/2021 Kato
2021/0107285 A1 4/2021 Kanazawa

FOREIGN PATENT DOCUMENTS

JP 2021-059073 A 4/2021
JP 2021-059088 A 4/2021
JP 2021-185046 A 12/2021

* cited by examiner

*Primary Examiner* — Ricardo I Magallanes
*Assistant Examiner* — Natasha Dephenia Quinn
(74) *Attorney, Agent, or Firm* — WORKMAN NYDEGGER

(57) ABSTRACT

A liquid ejection apparatus includes a liquid ejection head, an absorbing member, and a control unit, in which the liquid ejection head and the absorbing member are movable relative to each other in a scanning direction and a sub-scanning direction, the receiving area includes a plurality of first divided receiving areas and a plurality of second divided receiving areas, and the control unit performs flushing on one or more of the first divided receiving areas when there is no first divided receiving area exceeding a first reception limit when flushing is performed on the one or more corresponding first divided receiving areas by one or more nozzle arrays, and performs flushing on one or more of the second divided receiving areas when there is a first divided receiving area exceeding the first reception limit.

10 Claims, 8 Drawing Sheets

LIQUID EJECTION APPARATUS AND CONTROL METHOD FOR LIQUID EJECTION APPARATUS

The present application is based on, and claims priority from JP Application Serial Number 2023-051093, filed Mar. 28, 2023, the disclosure of which is hereby incorporated by reference herein in its entirety.

BACKGROUND

1. Technical Field

The present disclosure relates to a liquid ejection apparatus and a control method for the liquid ejection apparatus.

2. Related Art

For example, as disclosed in JP-A-2021-59088, there is a liquid ejecting device which is an example of a liquid ejection apparatus that performs printing by ejecting liquid from a liquid ejecting unit which is an example of a liquid ejection head. The liquid ejecting unit has a nozzle surface on which a nozzle ejecting liquid is formed.

A liquid ejection apparatus includes a liquid collecting device which is an example of a wiping unit. The liquid collecting device includes a belt-shaped member which is an example of an absorbing member capable of absorbing liquid. The liquid collecting device performs wiping for wiping the nozzle surface with the belt-shaped member and causes the belt-shaped member to receive liquid discharged by pressurizing cleaning.

When the absorbing member for wiping the nozzle surface also receives liquid discharged from nozzles, there is room for improvement in terms of efficient consumption of the belt-shaped member.

SUMMARY

In order to solve the above-described problems, there is provided a liquid ejection apparatus including a liquid ejection head having a nozzle surface on which a plurality of nozzle arrays are formed by a plurality of nozzles configured to eject liquid, an absorbing member configured to receive liquid ejected, for flushing, from the plurality of nozzles to a receiving area, and a control unit, in which the liquid ejection head and the absorbing member are movable relative to each other in a scanning direction and a sub-scanning direction, the plurality of nozzle arrays are configured to be disposed at predetermined intervals in the scanning direction and to each extend in the sub-scanning direction, the receiving area includes a plurality of first divided receiving areas corresponding respectively to the plurality of nozzle arrays in the scanning direction and a plurality of second divided receiving areas corresponding respectively to the plurality of nozzle arrays in the scanning direction, and the control unit performs flushing on one or more of the first divided receiving areas when there is no first divided receiving area exceeding a first reception limit when the flushing is performed, by one or more of the nozzle arrays, on the one or more corresponding first divided receiving areas, and performs flushing on one or more of the second divided receiving areas when there is a first divided receiving area exceeding the first reception limit when the flushing is performed, by one or more of the nozzle arrays, on the one or more corresponding first divided receiving areas.

In order to solve the above-described problems, there is provided a control method for a liquid ejection apparatus including a liquid ejection head having a nozzle surface on which a plurality of nozzle arrays are formed by a plurality of nozzles configured to eject liquid, an absorbing member configured to receive liquid ejected, for flushing, from the plurality of nozzles to a receiving area, and a control unit, in which the liquid ejection head and the absorbing member are movable relative to each other in a scanning direction and a sub-scanning direction, the plurality of nozzle arrays are configured to be disposed at predetermined intervals in the scanning direction and to each extend in the sub-scanning direction, the receiving area includes a plurality of first divided receiving areas corresponding respectively to the plurality of nozzle arrays in the scanning direction and a plurality of second divided receiving areas corresponding respectively to the plurality of nozzle arrays in the scanning direction, and the control method includes performing flushing on one or more of the first divided receiving areas when there is no first divided receiving area exceeding a first reception limit when the flushing is performed, by one or more of the nozzle arrays, on the one or more corresponding first divided receiving areas, and performing flushing on one or more of the second divided receiving areas when there is a first divided receiving area exceeding the first reception limit when the flushing is performed, by one or more of the nozzle arrays, on the one or more corresponding first divided receiving areas.

DESCRIPTION OF EMBODIMENTS

Embodiment

Figure 1:
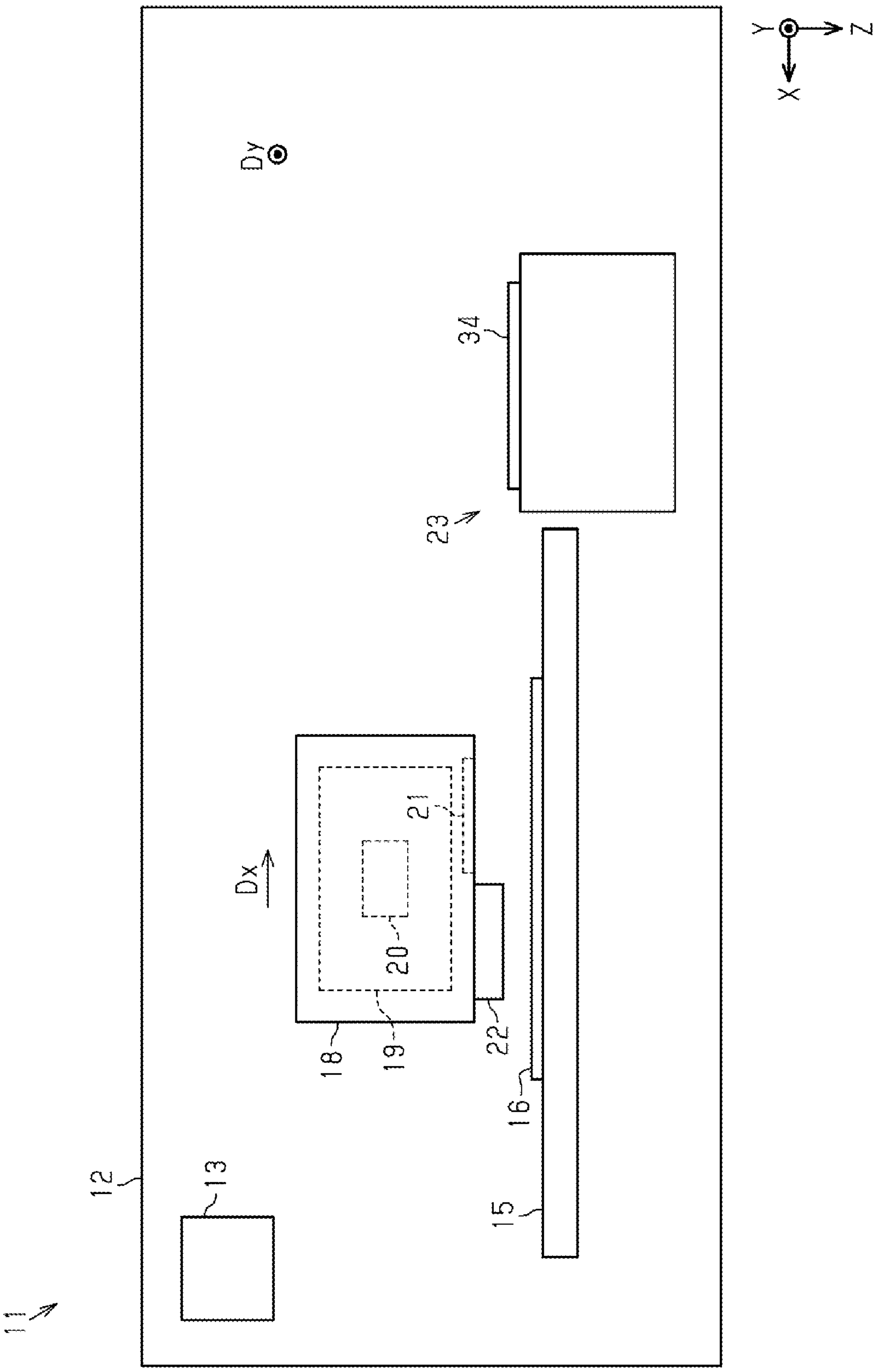
FIG. 1 is a schematic front view of a liquid ejection apparatus according to an embodiment.

An embodiment of a liquid ejection apparatus and a control method for the liquid ejection apparatus will be described below with reference to the drawings. The liquid ejection apparatus is, for example, an inkjet printer that ejects ink, which is an example of liquid, onto a medium such as paper, fabric, vinyl, a plastic part, or a metal part to perform recording on it.

In the drawings, a Z-axis represents a direction of gravity and an X-axis and a Y-axis represent directions along a horizontal plane, assuming that a liquid ejection apparatus 11 is placed on the horizontal plane. The X-axis, Y-axis, and Z-axis are orthogonal to each other. In the following description, a direction parallel to the Z-axis is also referred to as a vertical direction.

Liquid Ejection Apparatus

As illustrated in FIG. 1, the liquid ejection apparatus 11 includes a housing 12. The housing 12 accommodates various components included in the liquid ejection apparatus 11.

The liquid ejection apparatus 11 includes a control unit 13. The control unit 13 comprehensively controls driving of each mechanism in the liquid ejection apparatus 11 and controls various operations performed in the liquid ejection apparatus 11.

The control unit 13 can be configured as a circuit including a: one or more processors that execute various processes in accordance with a computer program, B: one or more dedicated hardware circuits that execute at least some of the various processes, or y: a combination thereof. The hardware circuit is, for example, an application-specific integrated circuit. The processor includes a CPU, and a memory such as a RAM and a ROM, and the memory stores program codes or instructions configured to cause the CPU to execute processes. The memory, that is, a computer-readable medium, includes any readable medium that can be accessed by a general purpose or dedicated computer.

The liquid ejection apparatus 11 may include a support unit 15. The support unit 15 is configured to support a medium 16.

The liquid ejecting apparatus 11 may include a carriage 18, a liquid accommodation unit 19, a pressurizing unit 20, a processing unit 21, a liquid ejection head 22, and a wiping unit 23.

The carriage 18 may movably hold the liquid accommodation unit 19, the pressurizing unit 20, the processing unit 21, and the liquid ejection head 22. That is, the liquid accommodation unit 19, the pressurizing unit 20, the processing unit 21, and the liquid ejection head 22 may be mounted on the carriage 18.

The liquid accommodation unit 19 is configured to accommodate liquid. The liquid accommodation unit 19 is coupled to the liquid ejection head 22 via a flow path, which is not illustrated in the drawing. The liquid accommodated in the liquid accommodation unit 19 is supplied to the liquid ejection head 22.

The pressurizing unit 20 is configured to be able to pressurize the inside of the liquid ejection head 22. The pressurizing unit 20 may pressurize the liquid in the liquid ejection head 22 or may supply the pressurized liquid to the liquid ejection head 22. The pressurizing unit 20 may perform pressurization discharge for discharging liquid from the liquid ejection head 22 by pressurizing the inside of the liquid ejection head 22.

The processing unit 21 may perform processing on the liquid ejected onto the medium 16. The processing unit 21 may include a light emitting element that emits ultraviolet rays. The processing performed by the processing unit 21 may be curing processing for curing the liquid by irradiating the liquid with ultraviolet rays. The processing unit 21 may fix the liquid onto the medium 16 by curing the liquid ejected onto the medium 16.

For example, the liquid is UV ink. The liquid may contain a component that is cured by the processing of the processing unit 21. For example, the liquid contains a photopolymerization initiator that initiates polymerization by ultraviolet energy. As the photopolymerization initiator, for example, a photoradical polymerization initiator or a photocationic polymerization initiator can be used.

The liquid ejection head 22 and the processing unit 21 may be provided side by side in a scanning direction Dx. The liquid ejection head 22 and the processing unit 21 may be provided at different positions in the scanning direction Dx with an interval therebetween in the scanning direction Dx.

Figure 2:
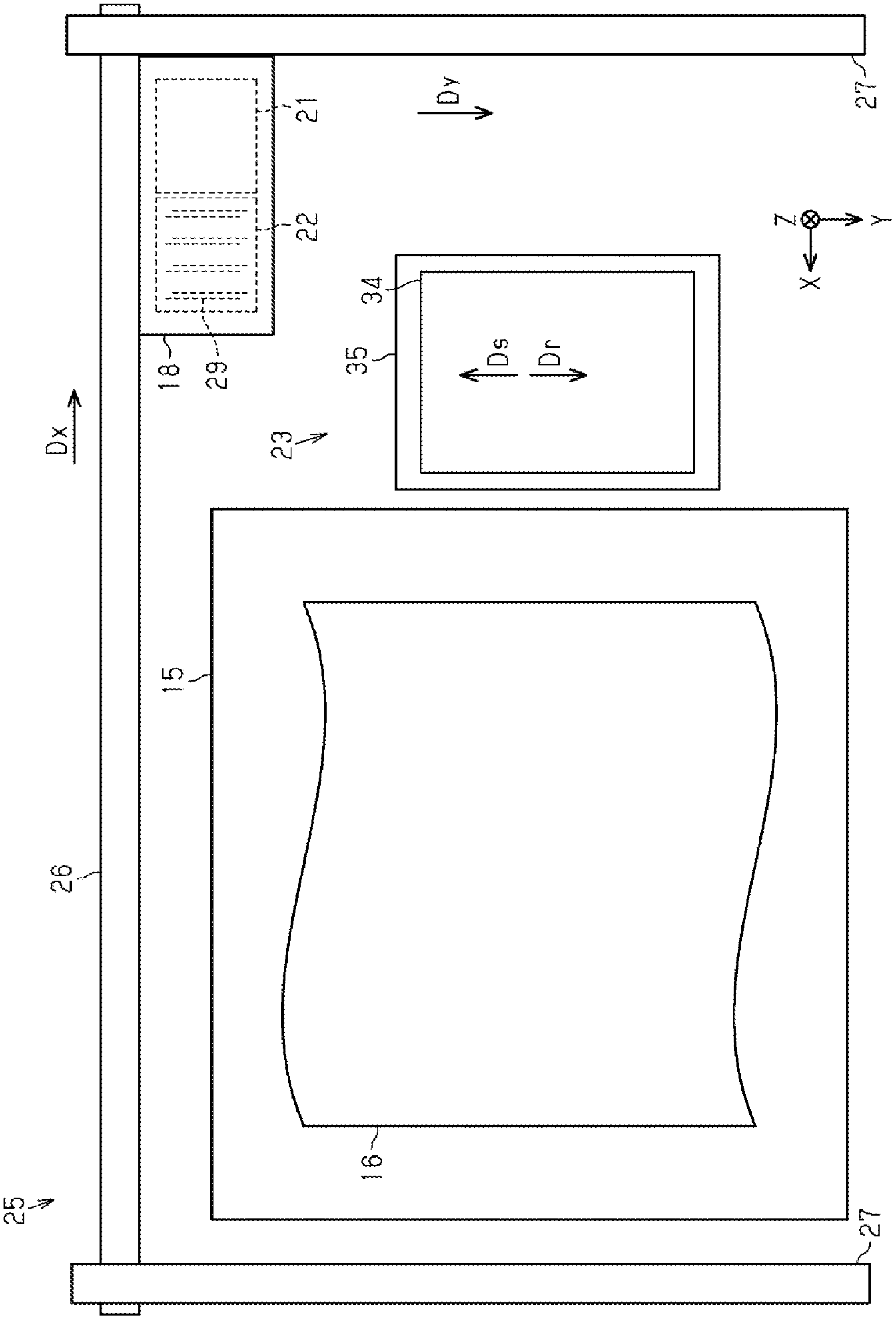
FIG. 2 is a schematic plan view of a moving mechanism.

As illustrated in FIG. 2, the liquid ejection apparatus 11 may include a moving mechanism 25. The moving mechanism 25 may include a horizontal shaft 26 and a vertical shaft 27. The moving mechanism 25 in the present embodiment includes a pair of vertical shafts 27.

The horizontal shaft 26 may extend in the scanning direction Dx. The pair of vertical shafts 27 may be provided parallel to each other so as to extend in a sub-scanning direction Dy. The scanning direction Dx in the present embodiment is a direction parallel to the X-axis. The sub-scanning direction Dy in the present embodiment is a direction perpendicular to the X-axis and parallel to the Y-axis.

The moving mechanism 25 causes the carriage 18 to reciprocate along the horizontal shaft 26. The moving mechanism 25 causes the horizontal shaft 26 supporting the carriage 18 to reciprocate along the vertical shaft 27. Thus, the moving mechanism 25 can move the liquid ejection head 22 and the processing unit 21 mounted on the carriage 18 in the scanning direction Dx and the sub-scanning direction Dy.

The moving mechanism 25 may simultaneously move the liquid ejection head 22 in the scanning direction Dx and the sub-scanning direction Dy. That is, the moving mechanism 25 may move the liquid ejection head 22 obliquely with respect to the scanning direction Dx and the sub-scanning direction Dy so as to be along the horizontal plane.

In the liquid ejection apparatus 11, the carriage 18 scans the medium 16. The liquid ejection head 22 ejects liquid while performing scanning together with the carriage 18, thereby recording an image on the medium 16. The carriage 18 in the present embodiment is configured to scan the medium 16 and also move in the sub-scanning direction Dy intersecting the scanning direction Dx in which the medium 16 is scanned. That is, the liquid ejection apparatus 11 in the present embodiment is a so-called lateral printer.

Liquid Ejection Head

Figure 3:
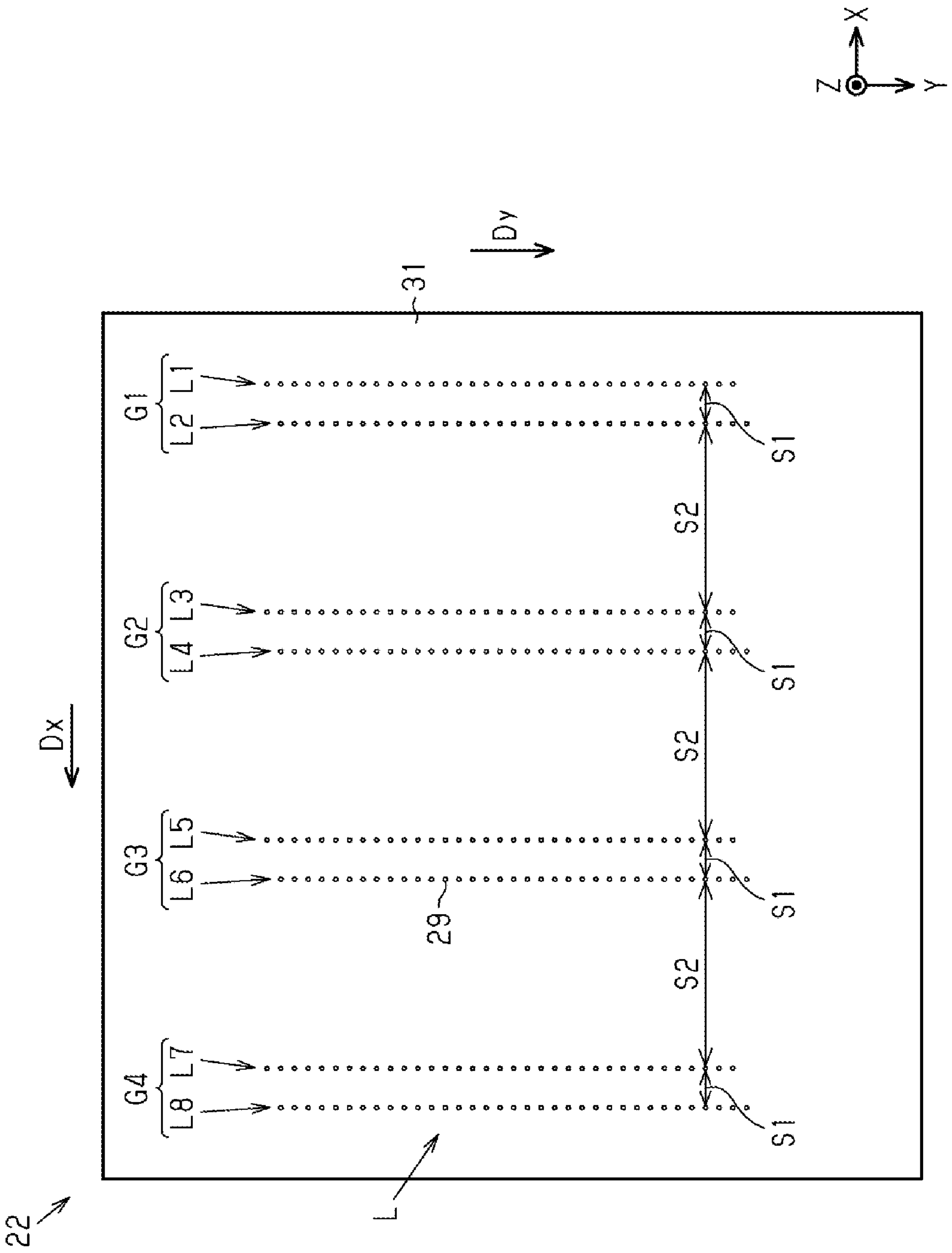
FIG. 3 is a schematic bottom view of a liquid ejection head.

As illustrated in FIG. 3, the liquid ejection head 22 is configured to eject liquid. The liquid ejection head 22 includes a plurality of nozzles 29. The nozzles 29 can eject liquid. The liquid ejection head 22 ejects liquid onto the medium 16 supported by the support unit 15 while moving, thereby recording an image on the medium 16.

The liquid ejection head 22 has a nozzle surface 31. A plurality of nozzle arrays L are formed at the nozzle surface 31 by the plurality of nozzles 29. In the present embodiment, eight nozzle arrays L formed at the nozzle surface 31 are also referred to as a first nozzle array L1 to an eighth nozzle array L8, respectively. The first nozzle array L1 to the eighth nozzle array L8 are lined up in the scanning direction Dx in order from the first nozzle array L1. One nozzle array L is formed by a plurality of nozzles 29 lined up in the sub-scanning direction Dy. Each of the plurality of nozzle arrays L is configured to extend in the sub-scanning direction Dy.

The plurality of nozzle arrays L are disposed at predetermined intervals in the scanning direction Dx. The plurality of nozzle arrays L may be formed at equal intervals in the scanning direction Dx or may be formed at different intervals. For example, in the first nozzle array L1 to the eighth nozzle array L8, some of the nozzle arrays L may be lined up to be close to each other in the scanning direction Dx.

In the present embodiment, two nozzle arrays L lined up to be close to each other are referred to as a nozzle group G. The liquid ejection head 22 in the present embodiment has four nozzle groups. The four nozzle groups are also referred to as a first nozzle group G1 to a fourth nozzle group G4, respectively. The first nozzle group G1 to the fourth nozzle group G4 may be lined up at equal intervals in the scanning direction Dx.

The first nozzle group G1 includes a first nozzle array L1 and a second nozzle array L2. The second nozzle group G2 includes a third nozzle array L3 and a fourth nozzle array L4. The third nozzle group G3 includes a fifth nozzle array L5 and a sixth nozzle array L6. The fourth nozzle group G4 includes a seventh nozzle array L7 and an eighth nozzle array L8.

In the scanning direction Dx, a first interval S1 between the nozzle arrays L lined up to be close to each other is narrower than a second interval S2 between the nozzle groups. That is, the first interval S1 between the first nozzle array L1 and the second nozzle array L2 is narrower than the second interval S2 between the second nozzle array L2 and the third nozzle array L3. The plurality of nozzle arrays L are formed at the first interval S1 which is an example of a predetermined interval or at the second interval S2 which is an example of a predetermined interval in the scanning direction Dx.

The liquid ejection head 22 may eject the same type of liquid from all of the nozzles 29. The liquid ejection head 22 may eject the same type of liquid in an arbitrary unit such as for each nozzle group or for each nozzle array L.

The liquid ejection head 22 may eject a plurality of types of liquid. The different types of liquid are, for example, inks of different colors. For example, the liquid ejection head 22 may eject magenta, yellow, cyan, and black inks from the first nozzle array L1 to the fourth nozzle array L4, respectively. For example, the liquid ejection head 22 may eject clear ink from the fifth nozzle array L5 and the sixth nozzle array L6. For example, the liquid ejection head 22 may eject white ink from the seventh nozzle array L7 and the eighth nozzle array L8.

Wiping Unit

As illustrated in FIG. 2, the wiping unit 23 may be provided at a position adjacent to the support unit 15, for example. The wiping unit 23 is configured to collect liquid discharged from the liquid ejection head 22 as waste liquid. The waste liquid is liquid that does not contribute to an image recorded on the medium 16. The waste liquid is generated by maintenance of the liquid ejection head 22, for example. For example, the wiping unit 23 collects the waste liquid from the liquid ejection head 22 located immediately above.

Examples of the maintenance of the liquid ejection head 22 include flushing, cleaning, and wiping.

The flushing is an operation of appropriately ejecting liquid from the nozzles 29 in order to suppress clogging of the nozzles 29. The flushing may be performed for each nozzle array L or for every plurality of nozzle arrays L, or may be performed collectively for all of the nozzle arrays L. When flushing is executed, the liquid ejection head 22 ejects liquid toward the wiping unit 23.

The control unit 13 may change the amount of liquid, which is discharged by flushing, for each flushing. The control unit 13 may change the amount of liquid, which is discharged by flushing, for each nozzle array L or for every plurality of nozzle arrays L. The control unit 13 may change the discharge amount by changing the size of droplets discharged by flushing, the number of droplets, or the like.

For example, when flushing is performed before recording, the control unit 13 may increase the discharge amount when a standby time during which recording is not performed is long, as compared to when a standby time is short. For example, when flushing is performed during recording or after recording, the control unit 13 may set a discharge amount from the nozzle array L which is not used for recording or has a small amount of liquid used to be larger than a discharge amount from the nozzle array L which has a large amount of liquid used for recording. For example, the control unit 13 may set a discharge amount from the nozzle array L ejecting liquid that is more likely to clog to be larger than a discharge amount from the nozzle array L ejecting liquid that is less likely to clog.

The cleaning is an operation of forcibly discharging liquid from the nozzles 29 in order to discharge foreign matter, air bubbles, and the like in the liquid ejection head 22. In the present embodiment, pressurization discharge is performed as cleaning. The pressurization discharge is cleaning in which the pressurizing unit 20 pressurizes liquid in the liquid ejection head 22 to forcibly discharge the liquid from the nozzles 29. When the pressurization discharge is performed, the liquid ejection head 22 discharges the liquid toward the wiping unit 23. The pressurization discharge is performed, for example, before recording or after recording. The pressurization discharge may be periodically performed during a standby period in which recording is not performed.

The control unit 13 may select one or more nozzle arrays L to perform pressurization discharge. The pressurization discharge may be performed for each nozzle array L or for every plurality of nozzle arrays L. The pressurization discharge may be performed collectively for all of the nozzle arrays L. The control unit 13 may change a timing at which liquid is pressurized, a period of time during which liquid is pressurized, the magnitude of pressure for pressurizing liquid, and the like for each nozzle array L or for every plurality of nozzle arrays L.

The wiping is an operation of wiping the liquid ejection head 22 in order to remove liquid adhering to the liquid ejection head 22. The wiping is performed, for example, after cleaning. When the wiping is performed, the liquid ejection head 22 is wiped by the wiping unit 23.

Figure 4:
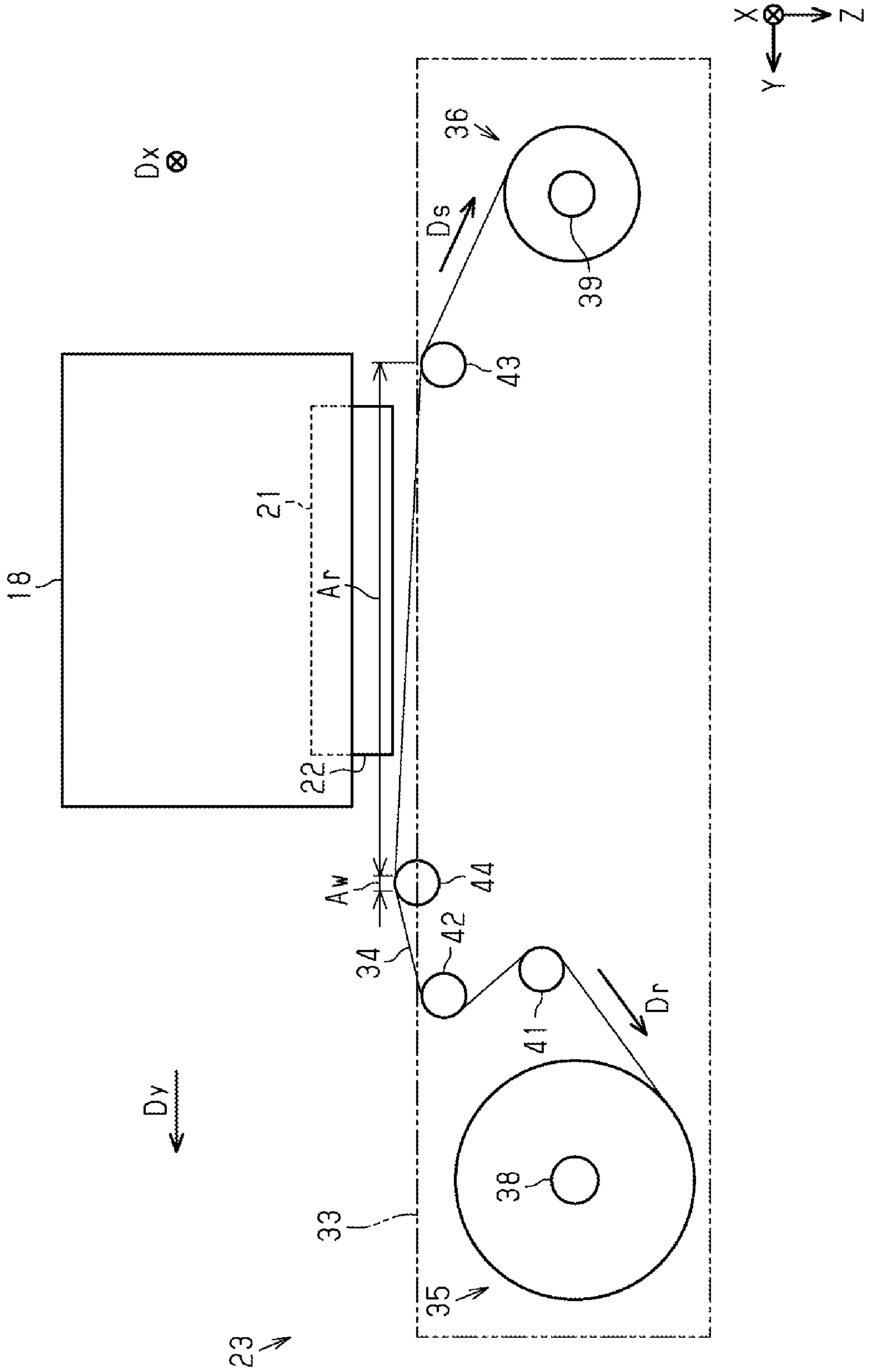
FIG. 4 is a schematic side view of a wiping unit.

As illustrated in FIG. 4, the wiping unit 23 may include a case 33, an absorbing member 34, a feeding unit 35, and a winding unit 36. The feeding unit 35 includes a feeding shaft 38. The winding unit 36 includes a winding shaft 39. The wiping unit 23 may include a first guide roller 41, a second guide roller 42, a third guide roller 43, and a pressing roller 44.

The case 33 may accommodate various components included in the wiping unit 23. The case 33 may support the feeding shaft 38, the winding shaft 39, the first guide roller 41 to the third guide roller 43, and the pressing roller 44 so as to extend in the scanning direction Dx. The case 33 is configured to be detachable from the housing 12, for example. For this reason, the wiping unit 23 can be replaced with respect to the liquid ejection apparatus 11.

The absorbing member 34 can absorb liquid. The absorbing member 34 can receive liquid discharged from the liquid ejection head 22. The absorbing member 34 absorbs waste liquid. The absorbing member 34 may be, for example, cloth or sponge. The absorbing member 34 in the present embodiment is an elongated member. In the scanning direction Dx, the width of the absorbing member 34 is larger than an interval between the first nozzle array L1 and the eighth nozzle array L8 which are the nozzle arrays L at both ends.

In the scanning direction Dx, the width of the absorbing member 34 may be larger than the width of the nozzle surface 31.

The feeding unit 35 may rotatably hold the unused absorbing member 34 that is wound in a roll shape. The feeding unit 35 unwinds and feeds the belt-shaped absorbing member 34 by the rotation of the feeding shaft 38.

The winding unit 36 may hold the used absorbing member 34. The winding unit 36 winds the absorbing member 34 in a roll shape by the rotation of the winding shaft 39. The winding unit 36 is located upstream of the feeding unit 35 in the sub-scanning direction Dy.

The feeding shaft 38 and the winding shaft 39 may be rotatable in a forward direction and a reverse direction. The feeding shaft 38 and the winding shaft 39 rotating in the forward direction feed the absorbing member 34 from the feeding unit 35 toward the winding unit 36 in a feeding direction Ds. The feeding shaft 38 and the winding shaft 39 that rotate in opposite directions feed the absorbing member 34 in a return direction Dr from the winding unit 36 toward the feeding unit 35. The return direction Dr is a direction opposite to the feeding direction Ds. The feeding direction Ds and the return direction Dr are directions along a path through which the absorbing member 34 passes.

The first guide roller 41, the second guide roller 42, the pressing roller 44, and the third guide roller 43 are provided in that order from the upstream in the feeding direction Ds. The first guide roller 41 to the third guide roller 43 determine a path through which the absorbing member 34 passes by guiding the absorbing member 34 wound therearound.

The pressing roller 44 can press the absorbing member 34 against the liquid ejection head 22. The pressing roller 44 is located between the feeding shaft 38 and the winding shaft 39 in the sub-scanning direction Dy and the feeding direction Ds. The absorbing member 34 is wound around the pressing roller 44. The pressing roller 44 may be configured to move up and down, for example. The pressing roller 44 may be pressed upward, for example, by a spring, which is not illustrated in the drawing.

The liquid ejection head 22 in the present embodiment is movable in the scanning direction Dx and the sub-scanning direction Dy. That is, the liquid ejection head 22 and the absorbing member 34 are movable relative to each other in the scanning direction Dx and the sub-scanning direction Dy. The liquid ejection head 22 moves toward the downstream in the sub-scanning direction Dy with respect to the wiping unit 23 in a state where the absorbing member 34 is pressed against the nozzle surface 31, and thus the nozzle surface 31 is wiped.

In the wiping unit 23, a wiping area Aw and a receiving area Ar are set at different positions. The wiping area Aw may be located downstream of the receiving area Ar in the sub-scanning direction Dy. The receiving area Ar may be located downstream of the wiping area Aw in the feeding direction Ds.

The wiping area Aw is an area where the nozzle surface 31 of the liquid ejection head 22 is wiped by the absorbing member 34 when the liquid ejection head 22 and the absorbing member 34 move relative to each other in the sub-scanning direction Dy. The wiping area Aw is also an area that is pressed against the pressing roller 44. The wiping area Aw is also an area in which the absorbing member 34 is sandwiched between the pressing roller 44 and the nozzle surface 31.

Receiving Area

The receiving area Ar is an area in which the absorbing member 34 receives liquid discharged from the plurality of nozzle arrays L. The receiving area Ar in the present embodiment is an area between the pressing roller 44 and the third guide roller 43. The absorbing member 34 can receive liquid discharged from the plurality of nozzles 29 to the receiving area Ar as flushing. The absorbing member 34 can receive liquid which is pressurized and discharged from the plurality of nozzles 29 to the receiving area Ar.

Figure 5:
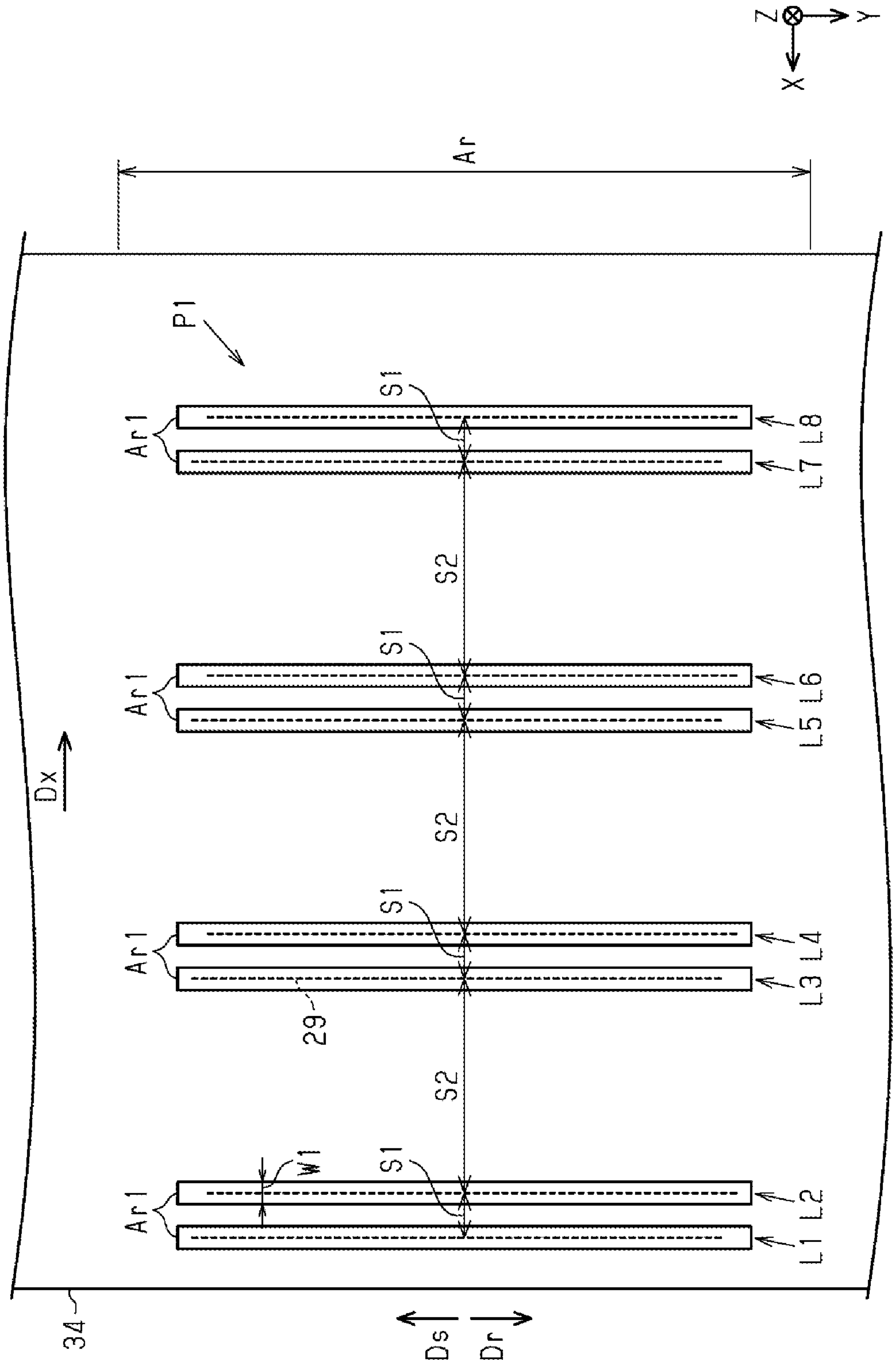
FIG. 5 is a schematic plan view of an absorbing member in which flushing is performed in a first divided receiving area.

As illustrated in FIG. 5, the receiving area Ar has a plurality of first divided receiving areas Ar1. In FIGS. 5 to 8, the plurality of first divided receiving areas Ar1 are indicated by solid lines. The plurality of first divided receiving areas Ar1 respectively correspond to the plurality of nozzle arrays L in the scanning direction Dx. The receiving area Ar has the same number of first divided receiving areas Ar1 as the number of nozzle arrays L. In FIGS. 5 to 8, the liquid ejection head 22 is not illustrated, and only the nozzles 29 are illustrated. The plurality of first divided receiving areas Ar1 are areas corresponding respectively to the first nozzle array L1 to the eighth nozzle array L8 when the liquid ejection head 22 is located at a first position P1. FIG. 5 illustrates a state where the plurality of nozzle arrays L are located at the first position P1. In the scanning direction Dx, the first widths W1 of the first divided receiving areas Ar1 are smaller than the first intervals S1. For example, in the scanning direction Dx, the first width W1 may be half of the first interval S1.

Figure 6:
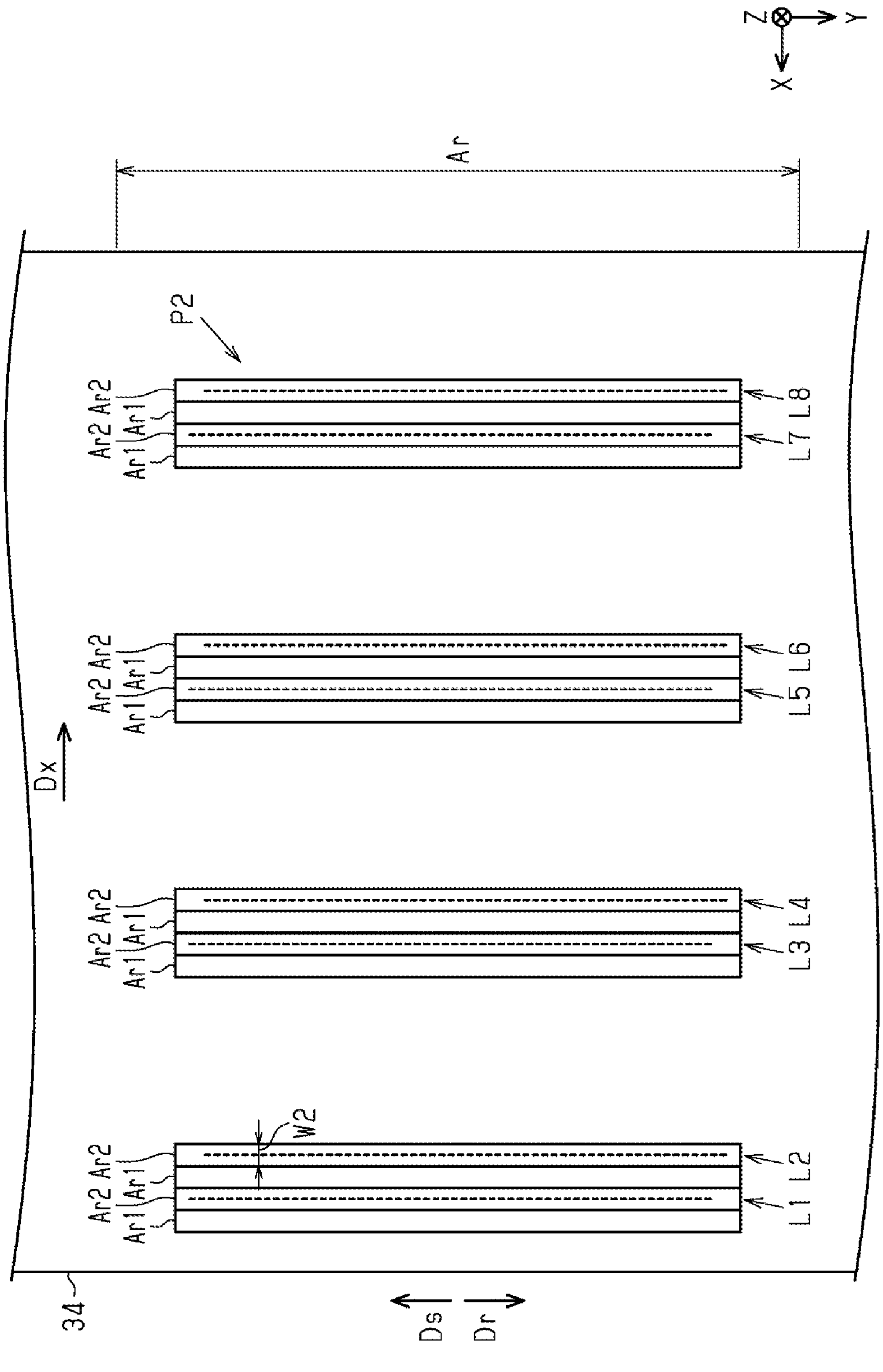
FIG. 6 is a schematic plan view of the absorbing member in which flushing is performed in a second divided receiving area.
Figure 7:
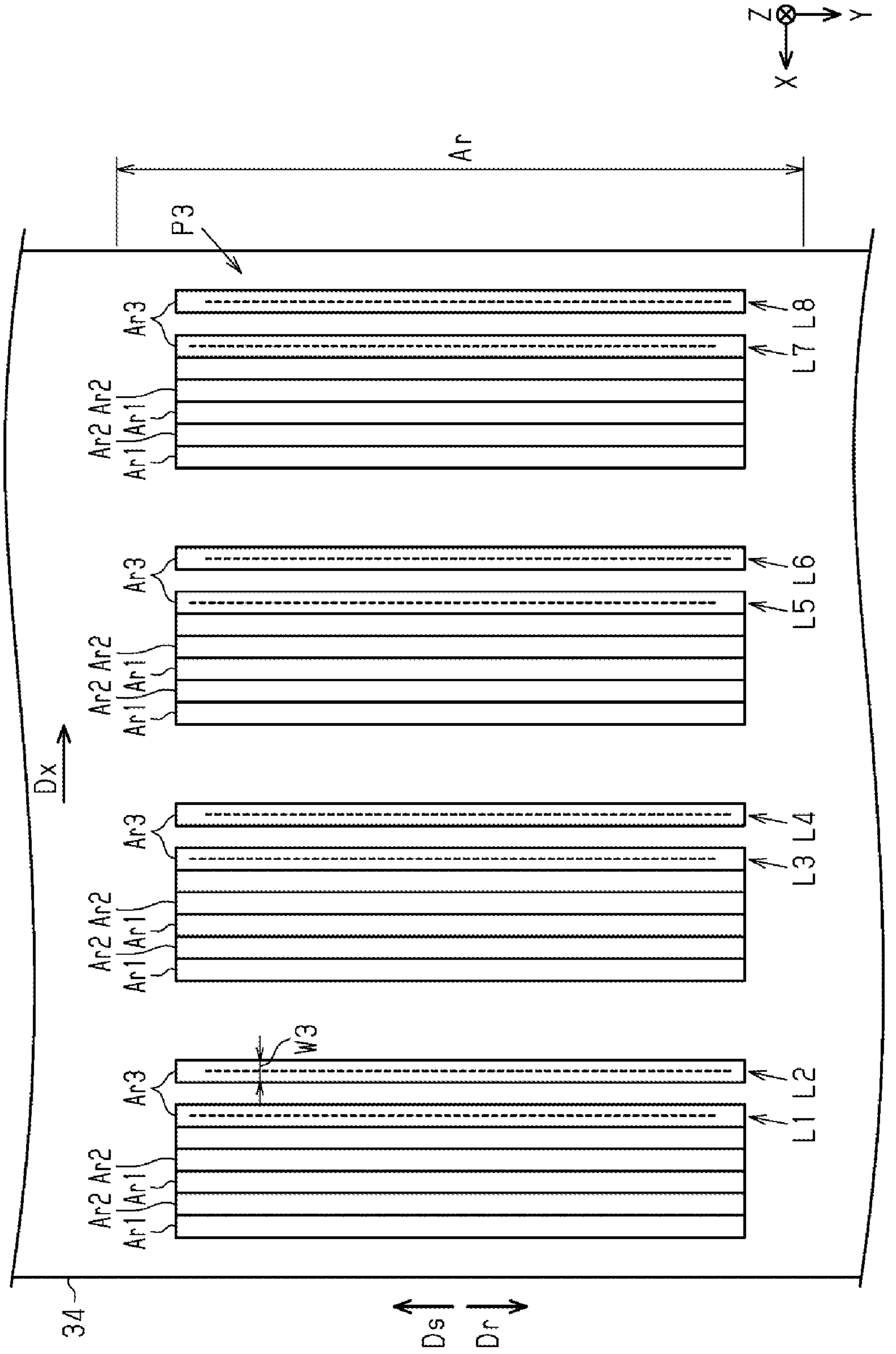
FIG. 7 is a schematic plan view of the absorbing member in which flushing is performed in a third divided receiving area.
Figure 8:
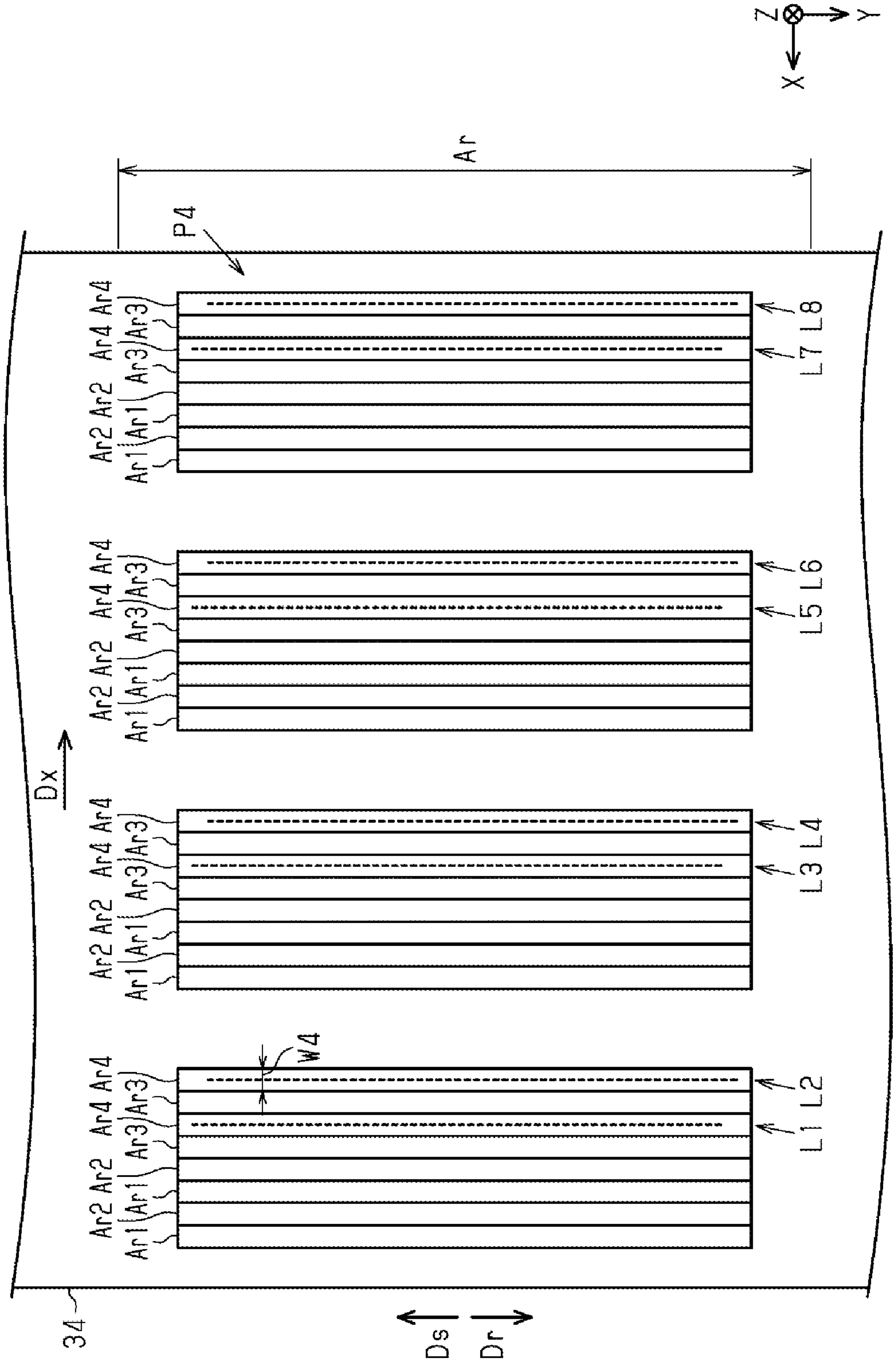
FIG. 8 is a schematic plan view of the absorbing member in which flushing is performed in a fourth divided receiving area.

As illustrated in FIG. 6, the receiving area Ar includes a plurality of second divided receiving areas Ar2. In FIGS. 6 to 8, the plurality of second divided receiving areas Ar2 are indicated by solid lines. The plurality of second divided receiving areas Ar2 respectively correspond to the plurality of nozzle arrays L in the scanning direction Dx. The receiving area Ar has the same number of second divided receiving areas Ar2 as the number of nozzle arrays L. The plurality of second divided receiving areas Ar2 are areas that the first nozzle array L1 to the eighth nozzle array L8 face when the liquid ejection head 22 is located at the second position P2. FIG. 6 illustrates a state where the plurality of nozzle arrays L are located at the second position P2. The second widths W2 of the second divided receiving areas Ar2 in the scanning direction Dx may be the same as the first widths W1. The second position P2 is, for example, a position shifted from the first position P1 in the scanning direction Dx by one first divided receiving area Ar1.

As illustrated in FIGS. 5 and 6, the second divided receiving area Ar2 corresponding to the first nozzle array L1 may be located between the first divided receiving area Ar1 corresponding to the first nozzle array L1 and the first divided receiving area Ar1 corresponding to the second nozzle array L2. The first divided receiving area Ar1 corresponding to the second nozzle array L2 may be located between the second divided receiving area Ar2 corresponding to the first nozzle array L1 and the second divided receiving area Ar2 corresponding to the second nozzle array L2.

As illustrated in FIG. 7, the receiving area Ar may include a plurality of third divided receiving areas Ar3. In FIGS. 7 and 8, the plurality of third divided receiving areas Ar3 are indicated by solid lines. The plurality of third divided receiving areas Ar3 respectively correspond to the plurality of nozzle arrays L in the scanning direction Dx. The receiving area Ar has the same number of third divided receiving areas Ar3 as the number of nozzle arrays L. The plurality of third divided receiving areas Ar3 are areas corresponding respectively to the first nozzle array L1 to the eighth nozzle array L8 when the liquid ejection head 22 is located at a third position P3. FIG. 7 illustrates a state where the plurality of nozzle arrays L are located at the third position P3. A third width W3 of the third divided receiving area Ar3 in the scanning direction Dx may be the same as the first width W1. The third position P3 is, for example, a position shifted from the second position P2 in the scanning direction Dx by one first divided receiving area Ar1 and one second divided receiving area Ar2.

As illustrated in FIGS. 5 to 7, the third divided receiving area Ar3 corresponding to the first nozzle array L1 and the second nozzle array L2 may be located between the second divided receiving area Ar2 corresponding to the second nozzle array L2 and the first divided receiving area Ar1 corresponding to the third nozzle array L3.

As illustrated in FIG. 8, the receiving area Ar may include a plurality of fourth divided receiving areas Ar4. In FIG. 8, the plurality of fourth divided receiving areas Ar4 are indicated by solid lines. The plurality of fourth divided receiving areas Ar4 respectively correspond to the plurality of nozzle arrays L in the scanning direction Dx. The receiving area Ar has the same number of fourth divided receiving areas Ar4 as the number of nozzle arrays L. The plurality of fourth divided receiving areas Ar4 are areas corresponding respectively to the first nozzle array L1 to the eighth nozzle array L8 when the liquid ejection head 22 is located at a fourth position P4. FIG. 8 illustrates a state where the plurality of nozzle arrays L are located at the fourth position P4. A fourth width W4 of the fourth divided receiving area Ar4 in the scanning direction Dx may be the same as the first width W1.

The fourth position P4 is, for example, a position shifted from the third position P3 in the scanning direction Dx by one third divided receiving area Ar3. The fourth divided receiving area Ar4 corresponding to the first nozzle array L1 may be located between the third divided receiving area Ar3 corresponding to the first nozzle array L1 and the third divided receiving area Ar3 corresponding to the second nozzle array L2.

Operations of Embodiment

Operations of the present embodiment will be described.

When flushing is performed, the control unit 13 sets the amount of liquid, which is discharged by the flushing, for each nozzle array L. The discharge amounts in the plurality of nozzle arrays L may be the same or different. The control unit 13 may set some of the plurality of nozzle arrays L to perform flushing. That is, there may be a nozzle array L in which a discharge amount is 0.

First, the control unit 13 determines whether there is an area exceeding a first reception limit of the first divided receiving area Ar1 when flushing is performed on one or more corresponding first divided receiving areas Ar1 by one or more nozzle arrays L. The control unit 13 determines whether the first reception limit is exceeded by the flushing before the flushing is performed.

The first reception limit may be indicated by, for example, at least one of a first limit amount and a first limit number of times. The control unit 13 in the present embodiment determines that the first reception limit is exceeded when either one or both of the first limit amount and the first limit number of times are exceeded.

The first limit amount is the amount of liquid that can be received by each of the first divided receiving areas Ar1. The first limit amount may be an amount that is common to the plurality of first divided receiving areas Ar1 or may be an amount that is set for each first divided receiving areas Ar1. The first limit amount is, for example, an amount that allows liquid to remain in the first divided receiving area Ar1. When the first divided receiving area Ar1 receives liquid exceeding the first limit amount, there is a concern that the liquid may overflow from the first divided receiving area Ar1.

The first limit number of times is the number of times of flushing that can be performed in each of the first divided receiving areas Ar1. The first limit number of times may be the number of times that is common to the plurality of first divided receiving areas Ar1, or may be the number of times that is set for each first divided receiving area Ar1. The first limit number of times is, for example, the number of times an appropriate space can be secured between the liquid ejection heads 22. When flushing is performed on the first divided receiving area Ar1 a plurality of times, liquid discharged in the subsequent flushing may be placed on liquid discharged and solidified in the previous flushing. When flushing is performed by the number of times exceeding the first limit number of times, there is a concern that it becomes difficult to secure a space necessary for discharging liquid between the liquid ejection heads 22 due to the accumulated liquid.

The control unit 13 determines whether the first reception limit is exceeded by flushing for each first divided receiving area Ar1.

Specifically, first, the control unit 13 sets a first discharge amount by which liquid is discharged from the first nozzle array L1 by flushing. Similarly, the control unit 13 sets a second discharge amount to an eighth discharge amount by which liquid is discharged by flushing from the second nozzle array L2 to the eighth nozzle array L8, respectively.

The control unit 13 acquires a received amount of liquid that has already been received by the first divided receiving area Ar1 corresponding to the first nozzle array L1 from, for example, a storage unit which is not illustrated in the drawing. When a difference between the first limit amount and the received amount is equal to or greater than the first discharge amount, the control unit 13 determines that the first divided receiving area Ar1 does not exceed the first limit amount even when flushing of the first nozzle array L1 is performed on the corresponding first divided receiving area Ar1.

The control unit 13 acquires the number of times of reception which is the number of times of flushing performed on the first divided receiving area Ar1 corresponding to the first nozzle array L1 from, for example, a storage unit which is not illustrated in the drawing. When a difference between the first limit number of times and the number of times of reception is equal to or greater than 1, the control unit 13 determines that the first divided receiving area Ar1 does not exceed the first limit number of times even when flushing of the first nozzle array L1 is performed on the corresponding first divided receiving area Ar1.

When both the first limit amount and the first limit number of times are not exceeded, the control unit 13 determines that the first divided receiving area Ar1 does not exceed the first reception limit even when flushing of the first nozzle array L1 is performed on the first divided receiving area Ar1.

Similarly to the first divided receiving area Ar1 corresponding to the first nozzle array L1, the control unit 13 determines whether the first reception limit is exceeded for each of the first divided receiving areas Ar1 corresponding to the second nozzle array L2 to the eighth nozzle array L8.

When the first reception limit is not exceeded in all of the first divided receiving areas Ar1, the control unit 13 performs flushing on the first divided receiving areas Ar1. That is, when there is no first divided receiving area Ar1 that exceeds the first reception limit when flushing is performed on one or more corresponding first divided receiving areas Ar1 by one or more nozzle arrays L, the control unit 13 performs flushing on the one or more first divided receiving areas Ar1.

As illustrated in FIG. 5, when flushing is performed on the first divided receiving area Ar1, the control unit 13 moves the liquid ejection head 22 so that the nozzle array L is located at the first position P1. The control unit 13 causes liquid to be discharged by the set discharge amount from each of the nozzle arrays L. The discharged liquid is received in the first divided receiving area Ar1 facing each of the nozzle arrays L.

The control unit 13 updates the received amount of each of the plurality of first divided receiving areas Ar1 to a value obtained by adding the discharge amount of liquid discharged from the corresponding nozzle array L. The control unit 13 updates the number of times of reception in the first divided receiving area Ar1 corresponding to the nozzle array L in which flushing has been performed to a value obtained by adding 1 thereto. When there is a nozzle array L in which a discharge amount is 0, the control unit 13 maintains the received amount and the number of times of reception for the first divided receiving area Ar1 corresponding to the nozzle array L.

When there is a first divided receiving area Ar1 exceeding the first reception limit when flushing is performed on one or more corresponding first divided receiving areas Ar1 by one or more nozzle arrays L, the control unit 13 does not perform flushing on the first divided receiving area Ar1. The control unit 13 searches for a divided receiving area in which flushing can be performed other than the first divided receiving area Ar1. Specifically, the control unit 13 determines whether a second reception limit of the second divided receiving area Ar2 is exceeded when flushing is performed on one or more corresponding second divided receiving areas Ar2 by one or more nozzle arrays L. The control unit 13 determines whether the second reception limit is exceeded by the flushing before the flushing is performed.

The second reception limit may be indicated by, for example, at least one of a second limit amount and a second limit number of times. The control unit 13 in the present embodiment determines that the second reception limit is exceeded when either one or both of the second limit amount and the second limit number of times are exceeded.

The second limit amount is the amount of liquid that can be received by each of second divided receiving areas Ar2. The second limit amount may be an amount that is common to the plurality of second divided receiving areas Ar2 or may be an amount that is set for each second divided receiving area Ar2. The second limit amount may be the same as the first limit amount.

The second limit number of times is the number of times of flushing that can be performed in each of the second divided receiving areas Ar2. The second limit number of times may be the number of times that is common to the plurality of second divided receiving areas Ar2, or may be the number of times that is set for each second divided receiving area Ar2. The second limit number of times may be the same as the first limit number of times.

The control unit 13 determines whether the second reception limit is exceeded by flushing for each second divided receiving area Ar2. A method of determining whether the second reception limit is exceeded in the second divided receiving area Ar2 is the same as a method of determining whether the first reception limit is exceeded in the first divided receiving area Ar1.

That is, for each second divided receiving area Ar2, the control unit 13 confirms whether a difference between the second limit amount and the received amount is equal to or larger than a discharge amount and a difference between the second limit number of times and the number of times of reception is equal to or larger than 1.

When both the second limit amount and the second limit number of times are not exceeded in all of the second divided receiving areas Ar2, the control unit 13 determines that the second reception limit is not exceeded even when flushing of each nozzle array L is performed in the second divided receiving area Ar2.

When the second reception limit is not exceeded in all of the second divided receiving areas Ar2, the control unit 13 performs flushing on the second divided receiving areas Ar2. That is, when there is a first divided receiving area Ar1 that exceeds the first reception limit when flushing is performed on one or more corresponding first divided receiving areas Ar1 by one or more nozzle arrays L, the control unit 13 performs flushing on the one or more second divided receiving areas Ar2. When there is no second divided receiving area Ar2 that exceeds the second reception limit when flushing is performed on one or more corresponding second divided receiving areas Ar2 by one or more nozzle arrays L, the control unit 13 performs flushing on the one or more second divided receiving areas Ar2.

As illustrated in FIG. 6, when flushing is performed on the second divided receiving area Ar2, the control unit 13 moves the liquid ejection head 22 so that the nozzle array L is located at the second position P2. The control unit 13 causes liquid to be discharged by the set discharge amount from each of the nozzle arrays L. The discharged liquid is received in the second divided receiving area Ar2 facing each of the nozzle arrays L. The control unit 13 updates the received amount and the number of times of reception of each of the plurality of second divided receiving areas Ar2 in the same manner as when flushing is performed on the first divided receiving area Ar1.

When there is a second divided receiving area Ar2 exceeding the second reception limit, the control unit 13 determines whether there is an area exceeding a third reception limit of the third divided receiving area Ar3 when flushing is performed on one or more corresponding third divided receiving areas Ar3 by one or more nozzle arrays L. The control unit 13 determines whether the third reception limit is exceeded by the flushing before the flushing is performed.

The third reception limit may be indicated by, for example, at least one of a third limit amount and a third limit number of times. The control unit 13 in the present embodiment determines that the third reception limit is exceeded when either one or both of the third limit amount and the third limit number of times are exceeded. The third limit amount may be the same as the first limit amount. The third limit number of times may be the same as the first limit number of times.

The control unit 13 determines whether the third reception limit is exceeded by flushing for each third divided receiving area Ar3. A method of determining whether the third reception limit is exceeded in the third divided receiving area Ar3 is the same as a method of determining whether the first reception limit is exceeded in the first divided receiving area Ar1, and thus the description thereof is omitted.

When the third reception limit is not exceeded in all of the third divided receiving areas Ar3, the control unit 13 performs flushing on the third divided receiving areas Ar3. That is, when there is a second divided receiving area Ar2 that exceeds the second reception limit when flushing is performed on one or more corresponding second divided receiving areas Ar2 by one or more nozzle arrays L, the control unit 13 performs flushing on the one or more third divided receiving areas Ar3. When there is no third divided receiving area Ar3 that exceeds the third reception limit when flushing is performed on one or more corresponding third divided receiving areas Ar3 by one or more nozzle arrays L, the control unit 13 performs flushing on the one or more third divided receiving areas Ar3.

As illustrated in FIG. 7, when flushing is performed on the third divided receiving area Ar3, the control unit 13 moves the liquid ejection head 22 so that the nozzle array L is located at the third position P3. The control unit 13 causes liquid to be discharged from each of the nozzle arrays L by the set discharge amount. The discharged liquid is received in the third divided receiving area Ar3 facing each of the nozzle arrays L. The control unit 13 updates the received amount and the number of times of reception of each of the plurality of third divided receiving areas Ar3 in the same manner as when flushing is performed on the first divided receiving area Ar1 and the second divided receiving area Ar2.

When there is a third divided receiving area Ar3 exceeding the third reception limit, the control unit 13 determines whether there is an area exceeding a fourth reception limit of the fourth divided receiving area Ar4 when flushing is performed on one or more corresponding fourth divided receiving areas Ar4 by one or more nozzle arrays L. The control unit 13 determines whether the fourth reception limit is exceeded by the flushing before the flushing is performed.

The fourth reception limit may be indicated by, for example, at least one of a fourth limit amount and a fourth limit number of times. The control unit 13 in the present embodiment determines that the fourth reception limit is exceeded when either one or both of the fourth limit amount and the fourth limit number of times are exceeded. The fourth limit amount may be the same as the first limit amount. The fourth limit number of times may be the same as the fourth limit number of times.

The control unit 13 determines whether the fourth reception limit is exceeded by flushing for each fourth divided receiving area Ar4. A method of determining whether the fourth reception limit is exceeded in the fourth divided receiving area Ar4 is the same as a method of determining whether the first reception limit is exceeded in the first divided receiving area Ar1, and thus the description thereof is omitted.

When the fourth reception limit is not exceeded in all of the fourth divided receiving areas Ar4, the control unit 13 performs flushing on the fourth divided receiving areas Ar4. That is, when there is a third divided receiving area Ar3 that exceeds the third reception limit when flushing is performed on one or more corresponding third divided receiving areas Ar3 by one or more nozzle arrays L, the control unit 13 performs flushing on the one or more fourth divided receiving areas Ar4. When there is no fourth divided receiving area Ar4 that exceeds the fourth reception limit when flushing is performed on one or more corresponding fourth divided receiving areas Ar4 by one or more nozzle arrays L, the control unit 13 performs flushing on the one or more fourth divided receiving areas Ar4.

As illustrated in FIG. 8, when flushing is performed on the fourth divided receiving area Ar4, the control unit 13 moves the liquid ejection head 22 so that the nozzle array L is located at the fourth position P4. The control unit 13 causes liquid to be discharged from each of the nozzle arrays L by the set discharge amount. The discharged liquid is received in the fourth divided receiving area Ar4 facing each of the nozzle arrays L. The control unit 13 updates the received amount and the number of times of reception of each of the plurality of fourth divided receiving areas Ar4 in the same manner as when flushing is performed on the first divided receiving area Ar1 to the third divided receiving area Ar3.

When there is a fourth divided receiving area Ar4 exceeding the fourth reception limit, the control unit 13 may determine that flushing has been performed from one end side to the other end side of the absorbing member 34 in the scanning direction Dx. That is, the control unit 13 determines that the first divided receiving area Ar1 located on a side closest to one end side to the fourth divided receiving area Ar4 located on a side closest to the other end side have been used.

The control unit 13 causes the liquid ejection head 22 and the absorbing member 34 to move relative to each other in the sub-scanning direction Dy. Specifically, the control unit 13 feeds the absorbing member 34 in the feeding direction Ds. The control unit 13 positions an unused portion of the absorbing member 34 in the receiving area Ar. After moving the liquid ejection head 22 and the absorbing member 34 relative to each other in the sub-scanning direction Dy, the control unit 13 performs flushing on one or more corresponding first divided receiving areas Ar1 by one or more nozzle arrays L.

The control unit 13 may cause the processing unit 21 to perform processing on the liquid received by the absorbing member 34. For example, the control unit 13 may cause the processing unit 21 to perform curing processing before feeding the absorbing member 34. For example, the control unit 13 may cause the processing unit 21 to perform the curing processing every time flushing is performed. The control unit 13 may cause the curing processing to be performed when any one of the first divided receiving area Ar1 to the fourth divided receiving area Ar4 exceeds a reception limit.

When the curing processing is performed, the control unit 13 positions the processing unit 21 above the receiving area Ar. The processing unit 21 in the present embodiment cures the liquid absorbed by the absorbing member 34 by irradiating the receiving area Ar with ultraviolet rays. The control unit 13 may cure the liquid while moving the absorbing member 34 in at least one of the feeding direction Ds and the returning direction Dr.

As illustrated in FIG. 4, the control unit 13 may perform maintenance of the liquid ejection head 22 in the order of cleaning, wiping, curing processing, and flushing, for example.

When the cleaning is performed, the control unit 13 positions the liquid ejection head 22 above the receiving area Ar. The control unit 13 may cause the liquid ejection head 22 and the absorbing member 34 to move relative to each other in the sub-scanning direction Dy so that the unused portion of the absorbing member 34 is located in the receiving area Ar. The control unit 13 in the present embodiment causes the liquid ejection head 22 and the absorbing member 34 to move relative to each other in the sub-scanning direction Dy by rotating the feeding shaft 38 and the winding shaft 39 in the forward direction to feed the absorbing member 34 in the feeding direction Ds. The control unit 13 may perform an operation of moving the liquid ejection head 22 above the receiving area Ar and an operation of feeding the absorbing member 34 in the feeding direction Ds separately or together.

The control unit 13 causes a portion of the absorbing member 34 that has absorbed the liquid to move to the downstream of the receiving area Ar in the feeding direction Ds. The control unit 13 causes the nozzle surface 31 and the portion of the absorbing member 34 that does not absorb the liquid to face each other in the vertical direction.

Subsequently, the control unit 13 causes the pressurizing unit 20 to pressurize the inside of the liquid ejection head 22. The liquid ejection head 22 discharges liquid from the nozzles 29 to the receiving area Ar. The discharged liquid is absorbed by a portion of the absorbing member 34 which is located in the receiving area Ar.

When the wiping is performed, the control unit 13 may perform wiping of the nozzle surface 31 by the absorbing member 34 located in the wiping area Aw. The control unit 13 may perform wiping by causing the liquid ejection head 22 and the wiping unit 23 to move relatively in the sub-scanning direction Dy. The control unit 13 in the present embodiment moves the liquid ejection head 22 in the sub-scanning direction Dy. The control unit 13 may move the wiping unit 23 in a direction opposite to the sub-scanning direction Dy. The liquid ejection head 22 moves so that the nozzle surface 31 comes into contact with a portion of the absorbing member 34 which is located in the wiping area Aw.

The control unit 13 may cure the liquid absorbed by the absorbing member 34 by causing the processing unit 21 to perform curing processing. When the curing processing is completed, the control unit 13 feeds the absorbing member 34 in the feeding direction Ds so that the unused portion of the absorbing member 34 is located in the receiving area Ar and the wiping area Aw.

When the flushing is performed, the control unit 13 causes the liquid ejection head 22 to be located above the receiving area Ar. The unused portion of the absorbing member 34 is located in the receiving area Ar. Thus, the control unit 13 causes the liquid ejection head 22 to be located at the first position P1 and causes liquid to be ejected from the nozzle arrays L to the first divided receiving area Ar1.

The control unit 13 may cause the flushing to be performed by an amount exceeding a first allowable amount at one time. That is, in at least one nozzle array L, a discharge amount of liquid discharged by the flushing may be larger than the first allowable amount. In this case, the control unit 13 causes the liquid ejection head 22 to move to the second position P2 after discharging the first allowable amount of liquid to the first divided receiving area Ar1.

For the nozzle array L in which a discharge amount is equal to or less than the sum of the first allowable amount and a second allowable amount, the control unit 13 causes liquid to be ejected to the second divided receiving area Ar2 by an amount obtained by subtracting the first allowable amount from the discharge amount.

For the nozzle array L in which a discharge amount is greater than the sum of the first allowable amount and the second allowable amount, the control unit 13 causes the second allowable amount of liquid to be ejected to the second divided receiving area Ar2 and then causes the liquid ejection head 22 to move to the third position P3.

Similarly, the control unit 13 causes the third divided receiving area Ar3 and the fourth divided receiving area Ar4 to receive liquid in this order until the liquid is discharged by the set discharge amount. When liquid cannot be discharged by the discharge amount even when flushing is performed on the fourth divided receiving area Ar4, the control unit 13 may cause the liquid ejection head 22 and the absorbing member 34 to move relative to each other in the sub-scanning direction Dy. That is, the control unit 13 may feed the absorbing member 34 in the feeding direction Ds so that the unused portion is located in the receiving area Ar, and then perform flushing on the first divided receiving area Ar1 again.

Effects of Embodiment

Effects of the present embodiment will be described.

(1-1) The control unit 13 performs flushing on the plurality of first divided receiving areas Ar1 so as not to exceed the first reception limit. For this reason, it is possible to efficiently consume the absorbing member 34 compared to, for example, when flushing is performed once for each of the plurality of first divided receiving areas Ar1.

(1-2) The control unit 13 performs flushing on the plurality of second divided receiving areas Ar2 so as not to exceed the second reception limit. For this reason, it is possible to efficiently consume the absorbing member 34 compared to, for example, when flushing is performed once for each of the plurality of second divided receiving areas Ar2.

(1-3) The control unit 13 performs flushing on the plurality of first divided receiving areas Ar1 so as not to exceed a receivable amount. For this reason, liquid ejected by the flushing can be absorbed by the absorbing member 34.

(1-4) When liquid discharged in the previous flushing is solidified when flushing is performed on the first divided receiving area Ar1 multiple times, liquid discharged in the subsequent flushing is placed on the solidified liquid. For this reason, as the number of times of flushing increases, there is a concern that the liquid may be accumulated. In this regard, the control unit 13 performs the flushing on the plurality of first divided receiving areas Ar1 so as not to exceed the number of times that the flushing can be performed.

For this reason, it is possible to secure a space necessary for discharging the liquid.

(1-5) After the control unit 13 performs flushing from one end side to the other end side of the absorbing member 34 in the scanning direction Dx, the control unit 13 causes the liquid ejection head 22 and the absorbing member 34 to move relative to each other in the sub-scanning direction Dy. For this reason, it is possible to efficiently consume the absorbing member 34 compared to when flushing is performed on a portion of the absorbing member 34 in the scanning direction Dx.

(1-6) The processing unit 21 cures liquid by performing processing on the liquid received by the absorbing member 34. For this reason, it is possible to reduce a concern that the surroundings are contaminated by the liquid received by the absorbing member 34.

(1-7) The absorbing member 34 receives liquid discharged by the pressurizing unit 20. For this reason, the absorbing member 34 can be used to receive both liquid discharged due to flushing and liquid discharged by the pressurizing unit 20.

(1-8) The absorbing member 34 performs wiping of the nozzle surface 31 at a portion located in the wiping area Aw. For this reason, the absorbing member 34 can be used to receive liquid discharged due to flushing and to wipe the nozzle surface 31.

Modification Example

The present embodiment can be implemented with the following modification examples. The present embodiment and the following modification examples can be implemented in combination with each other within a technically consistent range.

The liquid ejection apparatus 11 may include a plurality of liquid ejection heads 22. The plurality of liquid ejection heads 22 may be arranged in the same manner as the nozzle arrays L.

The control unit 13 may perform flushing on the same divided receiving area by the plurality of liquid ejection heads 22. That is, when a first liquid ejection head 22 performs flushing on the first divided receiving area Ar1, a second liquid ejection head 22 may also perform flushing on the first divided receiving area Ar1. The nozzle arrays L having the same number in the plurality of liquid ejection heads 22 may have the same discharge amount or different discharge amounts. A discharge amount of each nozzle array L by flushing may be a total amount in the plurality of liquid ejection heads 22. Specifically, the control unit 13 may compare the sum of the discharge amount of the first nozzle array L1 of the first liquid ejection head 22 and the discharge amount of the first nozzle array L1 of the second liquid ejection head 22 with the first limit amount.

The control unit 13 may perform flushing on different divided receiving areas by the plurality of liquid ejection heads 22.

The size of the receiving area Ar may be twice or more the size of the nozzle array L in the sub-scanning direction Dy. The size of each of the first divided receiving area Ar1 to the fourth divided receiving area Ar4 may be twice or more the size of the nozzle array L in the sub-scanning direction Dy. In the receiving area Ar, a plurality of divided receiving areas of each of the first to fourth divided receiving areas Ar1 to Ar4 may be set side by side in the sub-scanning direction Dy. The control unit 13 performs flushing from one end side to the other end side of the absorbing member 34 in the scanning direction Dx as in the above-described embodiment. Thereafter, the control unit 13 may move the liquid ejection head 22 in the sub-scanning direction Dy and then perform flushing on one or more corresponding first divided receiving areas Ar1 by one or more nozzle arrays L. The wiping unit 23 may be provided to be capable of reciprocating in the sub-scanning direction Dy. After moving the wiping unit 23 in the sub-scanning direction Dy, the control unit 13 may perform flushing on one or more corresponding first divided receiving areas Ar1 by one or more nozzle arrays L.

The control unit 13 may cause the plurality of nozzle arrays L to perform flushing one by one. The control unit 13 may cause some of the nozzle arrays L to perform flushing collectively. For example, the control unit 13 may cause odd-numbered nozzle arrays L to perform flushing and then cause even-numbered nozzle arrays L to perform flushing. The control unit 13 may cause all of the nozzle arrays L to perform flushing collectively.

The control unit 13 may determine whether the first reception limit is exceeded based on the number of times the processing unit 21 has performed processing on the first divided receiving area Ar1. The first reception limit may be indicated by the number of times of processing. The control unit 13 may determine whether the first reception limit is exceeded based on at least one of the amount of liquid received, the number of times of flushing, and the number of times of processing. When the processing unit 21 performs the processing, liquid is cured. For this reason, when flushing is performed on the processed liquid, it may be difficult to secure a space necessary for discharging the liquid between the liquid ejection heads 22 due to the accumulated liquid. A first processing limit number of times is the number of times of processing that can be performed on each of the first divided receiving areas Ar1. When a difference between the first processing limit number of times and the number of times of processing is equal to or greater than 1, the control unit 13 may determine that the first reception limit is not exceeded even when flushing of the first nozzle array L1 is performed on the first divided receiving area Ar1. The control unit 13 may also determine whether the other divided receiving areas exceed the reception limit using the processing limit number of times.

The receiving area Ar may include a plurality of first divided receiving areas Ar1 and a plurality of second divided receiving areas Ar2. In the scanning direction Dx, the first divided receiving areas Ar1 may be located on a side closest to one end side, and the second divided receiving areas Ar2 may be located on a side closest to the other end side.

The receiving area Ar may include a plurality of first divided receiving areas Ar1, a plurality of second divided receiving areas Ar2, and a third divided receiving area Ar3. In the scanning direction Dx, the first divided receiving areas Ar1 may be located on a side closest to one end side, and the third divided receiving areas Ar3 may be located on a side closest to the other end side.

In the embodiment described above, the scanning direction Dx may be an opposite direction. Regarding the first divided receiving area Ar1 and the second divided receiving area Ar2 corresponding to the same nozzle array L, the second divided receiving area Ar2 may be located at a position closer to the support unit 15 than the first divided receiving area Ar1.

The liquid ejection apparatus 11 may include a wiper separately from the wiping unit 23. The liquid ejection apparatus 11 may wipe the nozzle surface 31 with a wiper.

The liquid ejection apparatus 11 may include a reception unit separately from the wiping unit 23. The liquid ejection apparatus 11 may receive liquid, which is discharged from the nozzles 29 by the pressurizing unit 20 pressurizing the inside of the liquid discharging head 22, by the reception unit.

The liquid ejection apparatus 11 may be configured not to include the pressurizing unit 20. The liquid ejection apparatus 11 may include a cap that covers the plurality of nozzles 29 by coming into contact with the nozzle surface 31. The liquid ejection apparatus 11 may perform suction cleaning in which liquid is discharged from the nozzles 29 by setting the inside of the cap to a negative pressure.

The liquid ejection apparatus 11 may separately include the processing unit 21 that performs processing on liquid ejected onto the medium 16 and the processing unit 21 that performs processing on liquid received by the absorbing member 34, or may be configured not to include one or both of the processing units 21.

The processing unit 21 may include a heater, a blower, or the like. The processing unit 21 may cure liquid by drying the liquid.

The processing unit 21 may cure liquid by causing a reaction liquid for aggregating components included in the liquid to the medium 16 or the absorbing member 34. For example, the processing unit 21 may eject the reaction liquid from the liquid ejection head 22.

The liquid ejection apparatus 11 may be a liquid ejection apparatus that sprays or ejects liquid other than ink. The state of the liquid ejected from the liquid ejection apparatus in a form of a minute amount of droplet is assumed to include a particulate form, a teardrop form, and a thread like extending form. This liquid may be any material that can be ejected from the liquid ejection apparatus. For example, the liquid may be any material in a state of being in a liquid phase, and is assumed to include a liquid body having high or low viscosity, as well as a fluid body such as sol, gel water, other inorganic solvents, an organic solvent, a solution, a liquid resin, a liquid metal, and a metal melt. The liquid includes not only liquid as a single state of the material, but also includes particles of a functional material made of a solid such as pigment or metal particles dissolved in a solvent, dispersed or mixed in a solvent, and the like. Typical examples of the liquid include ink described in the embodiment above and liquid crystal. Here, ink is assumed to include a general aqueous ink and a solvent ink, as well as various liquid compositions such as gel ink and hot-melt ink. Examples of the liquid ejection apparatus include an apparatus that ejects liquid including, in a dispersed or dissolved form, a material such as an electrode material and a color material used in manufacture of liquid crystal displays, electroluminescent displays, surface emitting displays, color filters and the like. The liquid ejection apparatus may be an apparatus ejecting bioorganic substances used for biochip manufacturing, an apparatus used as a precision pipette and ejecting liquid to be a sample, a printing apparatus, a micro dispenser, or the like. The liquid ejection apparatus may be an apparatus ejecting lubricant to a precision machine such as a clock or a camera in a pinpoint manner, or an apparatus ejecting transparent resin liquid such as ultraviolet cure resin or the like on a substrate for forming a tiny hemispherical lens, optical lens, or the like used for an optical communication element and the like. The liquid ejection apparatus may be an apparatus ejecting etching liquid such as an acid or an alkali for etching a substrate or the like.

Definition

A representation "at least one" as used herein means "one or more" of desired options. As an example, a representation "at least one" as used herein means "only one option" or "both of two options" when the number of options is two. As another example, the representation "at least one" as used herein means "only one option" or "any combination of two or more options" when the number of options is three or more.

APPENDIX

Hereinafter, technical ideas and effects ascertained from the above-described embodiment and modification examples will be described.

(A) A liquid ejection apparatus includes a liquid ejection head having a nozzle surface on which a plurality of nozzle arrays are formed by a plurality of nozzles configured to eject liquid, an absorbing member configured to receive liquid ejected from the plurality of nozzles to a receiving area when flushing, and a control unit, in which the liquid ejection head and the absorbing member are movable relative to each other in a scanning direction and a sub-scanning direction, the plurality of nozzle arrays are configured to be disposed at predetermined intervals in the scanning direction and to each extend in the sub-scanning direction, the receiving area includes a plurality of first divided receiving areas corresponding respectively to the plurality of nozzle arrays in the scanning direction and a plurality of second divided receiving areas corresponding respectively to the plurality of nozzle arrays in the scanning direction, and the control unit performs flushing on one or more of the first divided receiving areas when there is no first divided receiving area exceeding a first reception limit when the flushing is performed, by one or more of the nozzle arrays, on the one or more corresponding first divided receiving areas, and performs flushing on one or more of the second divided receiving areas when there is a first divided receiving area exceeding the first reception limit when the flushing is performed, by one or more of the nozzle arrays, on the one or more corresponding first divided receiving areas.

According to this configuration, the control unit performs flushing on the plurality of first divided receiving areas so as not to exceed the first reception limit. For this reason, it is possible to efficiently consume the absorbing member compared to, for example, when flushing is performed once for each of the plurality of first divided receiving areas.

(B) In the liquid ejection apparatus according to (A), the receiving area may include a plurality of third divided receiving areas corresponding respectively to the plurality of nozzle arrays in the scanning direction, and the control unit may perform the flushing on the one or more second divided receiving areas when there is no second divided receiving area exceeding a second reception limit when the flushing is performed, by the one or more nozzle arrays, on the one or more corresponding second divided receiving areas, and perform the flushing on one or more of the third divided receiving areas when there is a second divided receiving area exceeding the second reception limit when the flushing is performed, by the one or more nozzle arrays, on the one or more corresponding second divided receiving areas.

According to this configuration, the control unit performs flushing on the plurality of second divided receiving areas so as not to exceed the second reception limit. For this reason, it is possible to efficiently consume the absorbing member compared to, for example, when flushing is performed once for each of the plurality of second divided receiving areas.

(C) In the liquid ejection apparatus according to (A) or (B), the first reception limit may be the amount of liquid that can be received by each of the first divided receiving areas.

According to this configuration, the control unit performs flushing on the plurality of first divided receiving areas so as not to exceed a receivable amount. For this reason, liquid ejected by the flushing can be absorbed by the absorbing member.

(D) In the liquid ejection apparatus according to any one of (A) to (C), the first reception limit may be the number of times of flushing that can be performed on each of the first divided receiving areas.

When liquid discharged in the previous flushing is solidified when flushing is performed on the first divided receiving area multiple times, liquid discharged in the subsequent flushing is placed on the solidified liquid. For this reason, as the number of times of flushing increases, there is a concern that the liquid may be accumulated. In this regard, according to this configuration, the control unit performs the flushing on the plurality of first divided receiving areas so as not to exceed the number of times that the flushing can be performed. For this reason, it is possible to secure a space necessary for discharging the liquid.

(E) In the liquid ejection apparatus according to (A) to (D), the control unit may perform the flushing from one end side to the other end side of the absorbing member in the scanning direction, cause the liquid ejection head and the absorbing member to move relative to each other in the sub-scanning direction, and then perform the flushing on the one or more corresponding first divided receiving areas by the one or more nozzle arrays.

According to this configuration, after the control unit performs flushing from one end side to the other end side of the absorbing member in the scanning direction, the control unit causes the liquid ejection head and the absorbing member to move relative to each other in the sub-scanning direction. For this reason, it is possible to efficiently consume the absorbing member compared to when flushing is performed on a portion of the absorbing member in the scanning direction.

(F) The liquid ejection apparatus according to (A) to (E) may further include a processing unit configured to perform processing on liquid ejected onto a medium, in which the liquid may include a component that is cured by the processing, and the control unit may cause the processing unit to perform the processing on the liquid received by the absorbing member.

According to this configuration, the processing unit cures liquid by performing processing on the liquid received by the absorbing member. For this reason, it is possible to reduce a concern that the surroundings are contaminated by the liquid received by the absorbing member.

(G) The liquid ejection apparatus according to (A) to (F) may further include a pressurizing unit configured to pressurize an inside of the liquid ejection head, in which the control unit may cause the liquid ejection head and the absorbing member to move relative to each other in the sub-scanning direction so that an unused portion of the absorbing member is located in the receiving area, and then causes the pressurizing unit to pressurize the inside of the liquid ejection head to discharge liquid from the plurality of nozzles to the receiving area.

According to this configuration, the absorbing member receives liquid discharged by the pressurizing unit. For this reason, the absorbing member can be used to receive both liquid discharged due to flushing and liquid discharged by the pressurizing unit.

(H) In the liquid ejection apparatus according to (A) to (G), the control unit may perform wiping of the nozzle surface by the absorbing member located in a wiping area.

According to this configuration, the absorbing member performs wiping of the nozzle surface at a portion located in the wiping area. For this reason, the absorbing member can be used to receive liquid discharged due to flushing and to wipe the nozzle surface.

(I) A control method for a liquid ejection apparatus is a control method for a liquid ejection apparatus including a liquid ejection head having a nozzle surface on which a plurality of nozzle arrays are formed by a plurality of nozzles configured to eject liquid, an absorbing member configured to receive liquid ejected from the plurality of nozzles to a receiving area when flushing, and a control unit, in which the liquid ejection head and the absorbing member are movable relative to each other in a scanning direction and a sub-scanning direction, the plurality of nozzle arrays are configured to be disposed at predetermined intervals in the scanning direction and to each extend in the sub-scanning direction, the receiving area includes a plurality of first divided receiving areas corresponding respectively to the plurality of nozzle arrays in the scanning direction and a plurality of second divided receiving areas corresponding respectively to the plurality of nozzle arrays in the scanning direction, and the control method includes performing flushing on one or more of the first divided receiving areas when there is no first divided receiving area exceeding a first reception limit when the flushing is performed, by one or more of the nozzle arrays, on the one or more corresponding first divided receiving areas, and performing flushing on one or more of the second divided receiving areas when there is a first divided receiving area exceeding the first reception limit when the flushing is performed, by one or more of the nozzle arrays, on the one or more corresponding first divided receiving areas. According to this configuration, it is possible to exhibit the same effects as those of the liquid ejection apparatus described above.

(J) In the control method for the liquid ejection apparatus according to (I), the receiving area may include a plurality of third divided receiving areas corresponding respectively to the plurality of nozzle arrays in the scanning direction, and the control method may include performing the flushing on the one or more second divided receiving areas when there is no second divided receiving area exceeding a second reception limit when the flushing is performed, by the one or more nozzle arrays, on the one or more corresponding second divided receiving areas, and performing the flushing on one or more of the third divided receiving areas when there is a second divided receiving area exceeding the second reception limit when the flushing is performed, by the one or more nozzle arrays, on the one or more corresponding second divided receiving areas. According to this configuration, it is possible to exhibit the same effects as those of the liquid ejection apparatus described above.

What is claimed is:

1. A liquid ejection apparatus comprising:

a liquid ejection head having a nozzle surface on which a plurality of nozzle arrays are formed by a plurality of nozzles configured to eject liquid, each of the plurality of nozzle arrays extending in a sub-scanning direction being a medium width direction, the plurality of nozzle arrays disposed at predetermined intervals in a scanning direction that is perpendicular to the sub-scanning direction;

an absorbing member configured to receive liquid ejected, for flushing, from the plurality of nozzles to a receiving area, the liquid ejection head and the absorbing member being movable relative to each other in the scanning direction and the sub-scanning direction, the absorbing member being advanceable in the sub-scanning direction; and a control unit configured to perform flushing in a single flushing operation by:

flushing on a plurality of first divided receiving areas by, for each of at least some of the nozzle arrays, causing the nozzle array to flush on a respective receiving area of the plurality of first divided receiving areas, each of the first divided receiving areas also extending in the sub-scanning direction and being disposed at the predetermined intervals in the scanning direction; and while the absorbing member is at a position that is not further advanced in the sub-scanning direction, flushing on a plurality of second divided receiving areas when there is a first divided receiving area that exceeds a reception limit by, for each some of the nozzles arrays, causing the nozzle array to flush on a respective receiving area of the plurality of second divided receiving areas, the plurality of second divided receiving areas being at a same position as the plurality of first divided receiving areas in the sub-scanning direction, but being offset from the plurality of first divided receiving areas in the scanning direction.

2. The liquid ejection apparatus according to claim 1, the reception limit being a first reception limit the control unit further configured to perform the flushing on a plurality of third divided receiving areas when there is a second divided receiving area exceeding a second reception limit by, for each some of the nozzles arrays, causing the nozzle array to flush on a respective receiving area of the plurality of third divided receiving areas, the plurality of third divided receiving areas being at a same position as the plurality of first and second divided receiving areas in the sub-scanning direction, but being offset from the plurality of first and second divided receiving areas in the scanning direction.

3. The liquid ejection apparatus according to claim 1, wherein the reception limit is the amount of liquid that can be received by each of the plurality of first divided receiving areas.

4. The liquid ejection apparatus according to claim 1, wherein the reception limit is the number of times of flushing that can be performed on each of the plurality of first divided receiving areas.

5. The liquid ejection apparatus according to claim 1, wherein the control unit is configured to perform the flushing from one end side to the other end side of the absorbing member in the scanning direction, to cause the liquid ejection head and the absorbing member to move relative to each other in the sub-scanning direction, and then to perform the flushing on the one or more corresponding first divided receiving areas by the one or more nozzle arrays.

6. The liquid ejection apparatus according to claim 1, further comprising a processing unit configured to perform processing on liquid ejected onto a medium, wherein the liquid includes a component that is cured by the processing, and the control unit is configured to cause the processing unit to perform the processing on the liquid received by the absorbing member.

7. The liquid ejection apparatus according to claim 1, further comprising a pressurizing unit configured to pressurize an inside of the liquid ejection head, wherein the control unit is configured to cause the liquid ejection head and the absorbing member to move relative to each other in the sub-scanning direction so that an unused portion of the absorbing member is located in the receiving area, and then to cause the pressurizing unit to pressurize the inside of the liquid ejection head to discharge liquid from the plurality of nozzles to the receiving area.

8. The liquid ejection apparatus according to claim 1, wherein the control unit is configured to perform wiping of the nozzle surface by the absorbing member located in a wiping area.

9. A control method for a liquid ejection apparatus including a liquid ejection head, an absorbing member and a control unit; the liquid ejection head having a nozzle surface on which a plurality of nozzle arrays are formed by a plurality of nozzles configured to eject liquid, each of the plurality of nozzle arrays extending in a sub-scanning direction being a medium width direction, the plurality of nozzle arrays disposed at predetermined intervals in a scanning direction that is perpendicular to the sub-scanning direction, the absorbing member configured to receive liquid ejected, for flushing, from the plurality of nozzles to a receiving area, the liquid ejection head and the absorbing member being movable relative to each other in the scanning direction and the sub-scanning direction, the absorbing member being advanceable in the sub-scanning direction and a control unit, the control method comprises the control unit causing a single flushing operation by:

flushing on a plurality of first divided receiving areas by, for each of at least some of the nozzle arrays, causing the nozzle array to flush on a respective receiving area of the plurality of first divided receiving areas, each of the first divided receiving areas also extending in the sub-scanning direction and being disposed at the predetermined intervals in the scanning direction; and while the absorbing member is at a position that is not further advanced in the sub-scanning direction, flushing on a plurality of second divided receiving areas when there is a first divided receiving area that exceeds a reception limit by, for each some of the nozzles arrays, causing the nozzle array to flush on a respective receiving area of the plurality of second divided receiving areas, the plurality of second divided receiving areas being at a same position as the plurality of first divided receiving areas in the sub-scanning direction, but being offset from the plurality of first divided receiving areas in the scanning direction.

10. The control method for the liquid ejection apparatus according to claim 9, the reception limit being a first reception limit, the control method further comprising performing the flushing on a plurality of third divided receiving areas when there is a second divided receiving area exceeding a second reception limit by, for each some of the nozzles arrays, causing the nozzle array to flush on a respective receiving area of the plurality of third divided receiving areas, the plurality of third divided receiving areas being at a same position as the plurality of first and second divided receiving areas in the sub-scanning direction, but being offset from the plurality of first and second divided receiving areas in the scanning direction.

* * * * *